V. T. POST.
PLOW ATTACHMENT.
APPLICATION FILED SEPT. 19, 1911.
1,023,678.
Patented Apr. 16, 1912.
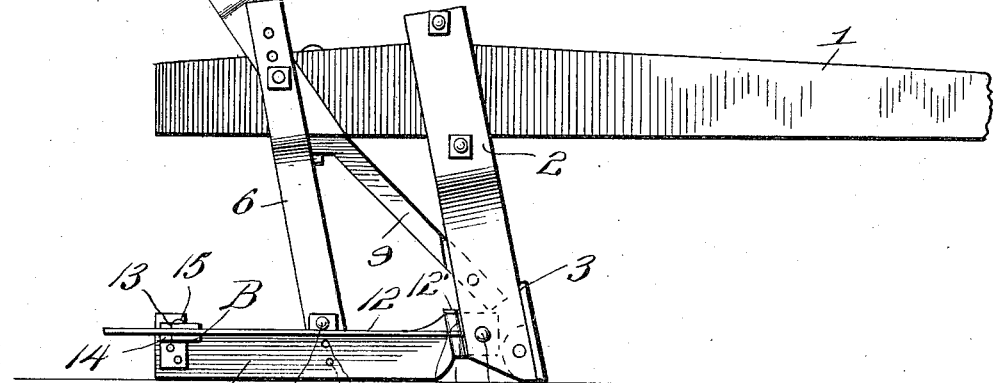
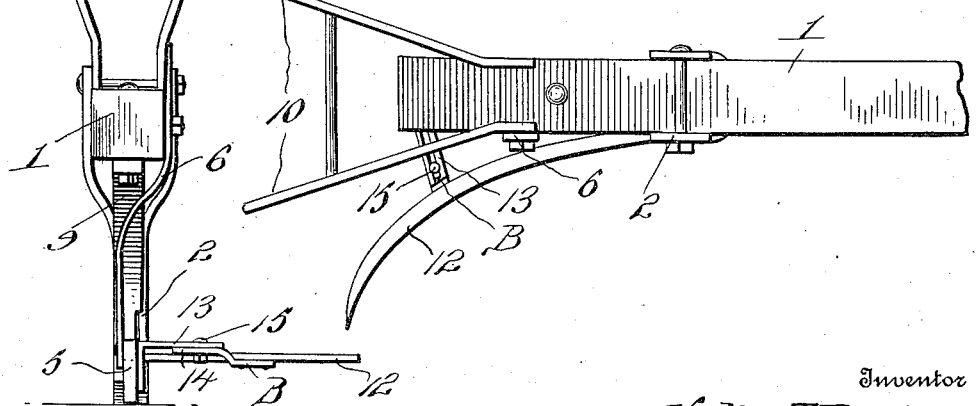
Witnesses
Wm. S. McDowell
Wm. T. Ragger
Inventor
Valta T. Post
By Victor J. Evans
Attorney

UNITED STATES PATENT OFFICE.

VALTA T. POST, OF COMO, TEXAS.

PLOW ATTACHMENT.

1,023,678.    Specification of Letters Patent.    Patented Apr. 16, 1912.

Application filed September 19, 1911. Serial No. 650,096.

*To all whom it may concern:*

Be it known that I, VALTA T. POST, a citizen of the United States, residing at Como, in the county of Hopkins and State of Texas, have invented new and useful Improvements in Plow Attachments, of which the following is a specification.

This invention relates to plow attachments, and it has for its object to produce a simple and efficient attachment to be used in connection with that type of plow stock which is generally known as the "Georgia plow stock"; said attachment being for the purpose of cutting and clearing away pea and other vines so that such vines shall not interfere with subsequent cultivation.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a side elevation of a plow stock equipped with the invention. Fig. 2 is a top plan view of the same. Fig. 3 is a rear elevation.

Corresponding parts in the several figures are denoted by like characters of reference.

The plow beam 1 carries the customary bifurcated standard 2 having at its lower end a seat 3 upon which a plow of the "bull tongue" or other suitable type may be mounted. Pivotally mounted between the side members of the bifurcated standard 2 upon a bolt 4 is the bed bar or runner 5 which is connected with the beam by means of a brace 6 having a plurality of apertures 7 for the passage of the fastening bolt 8, thus enabling adjustment of the bed bar to be effected. A brace 9 connects the standard with the underside of the beam 1, and the latter is equipped with handles 10.

The bed bar or runner is provided directly in rear of the standard 2 with apertured lugs 11 between which is inserted the front end of a curved blade 12, said blade being pivotally mounted upon a bolt 12' that extends through the lugs 11 and through said blade. The rear end of the curved blade is spaced from the bed bar by means of a brace member B which is composed of two overlapping members 13 and 14 which are adjustably connected by means of a bolt 15, thus enabling the rear end of the curved blade to be spaced at various distances from the rear end of the bed bar 1.

In the operation of this device, the blade or cutter 12 will engage and cut pea vines and other obstructions at one side of the plow, thus clearing the path for the next round of the latter and enabling the ground to be thoroughly and profitably tilled.

Having thus described the invention, what is claimed as new, is:—

1. A plow beam having a bifurcated standard, a bed bar pivoted between the side members of said standard, a brace connecting the bed bar adjustably with the beam, and a laterally extending cutting member associated with the bed bar.

2. A plow beam having a bifurcated standard, a bed bar pivotally associated with said standard and having lugs directly in rear of said standard, a curved cutting member pivoted between said lugs, means for adjustably connecting said cutting member with the rear end of the bed bar, and means for adjustably connecting the bed bar with the beam.

3. A plow beam having a standard, a bed bar pivotally connected with said standard, said bed bar being provided with laterally extending lugs, a curved cutting member supported pivotally between said lugs, a brace connecting the cutting member with the rear end of the bed bar, said brace being composed of two overlapping adjustably connected members, and a brace adjustably connecting the bed bar with the beam.

In testimony whereof I affix my signature in presence of two witnesses.

VALTA T. POST.

Witnesses:
W. H. APPLETON,
J. P. MINTER.

Copies of this patent may be obtained for five cents each, by addressing the "Commissioner of Patents, Washington, D. C."